(12) United States Patent
Hotelling et al.

(10) Patent No.: US 8,274,740 B2
(45) Date of Patent: Sep. 25, 2012

(54) BEAM SPLITTER

(75) Inventors: Kenneth Raymond Hotelling, Ramona, CA (US); Jerry E. Fox, Lakeside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 677 days.

(21) Appl. No.: 12/427,171

(22) Filed: Apr. 21, 2009

(65) Prior Publication Data

US 2010/0265587 A1  Oct. 21, 2010

(51) Int. Cl.
*G02B 27/10* (2006.01)
*G02B 26/08* (2006.01)
*G02B 27/14* (2006.01)
*G02B 5/04* (2006.01)

(52) U.S. Cl. .......... 359/618; 359/207.8; 359/211.1; 359/629; 359/834

(58) Field of Classification Search .......... 359/196.1, 359/197.1, 201.1, 201.2, 202.1, 203.1, 207.8, 359/209.1, 211.1, 212.1, 213.1, 223.1, 629, 359/636, 833, 834, 839, 618, 850, 872
See application file for complete search history.

(56) References Cited

U.S. PATENT DOCUMENTS

| | | | |
|---|---|---|---|
| 2,795,164 A | 6/1957 | Hendrix | |
| 3,966,328 A | 6/1976 | Wiklund | |
| 4,025,173 A | 5/1977 | Schmaedeke | |
| 4,820,031 A | 4/1989 | Kastendieck et al. | |
| 5,617,202 A | 4/1997 | Rando | |
| 6,005,716 A | 12/1999 | Ligtenberg et al. | |
| 7,199,936 B2 * | 4/2007 | Williams et al. | 359/638 |
| 7,268,951 B2 | 9/2007 | Dang et al. | |

* cited by examiner

*Primary Examiner* — Dawayne A Pinkney
(74) *Attorney, Agent, or Firm* — Jack H. McKinney

(57) ABSTRACT

A beam splitter includes a first surface and a second surface. The first and second surfaces are linearly offset from one another along an axis. The first and second surfaces are positioned to receive an optical beam projected in a first direction that is generally perpendicular to the axis. The first surface is configured to redirect a first portion of the optical beam in a second direction that has a first rotational offset with respect to the first direction and a second rotational offset with respect to the axis. The second surface is configured to redirect a second portion of the optical beam in a third direction that has a third rotational offset with respect to the first direction and a fourth rotational offset with respect to the axis.

17 Claims, 9 Drawing Sheets

BEAM SPLITTER

BACKGROUND

Sensor systems employing optical beam splitters are often implemented in media sorting applications. Such sensor systems rely on a mechanical alignment of an optical beam with a beam splitter. In a given example, a beam splitter redirects a first portion of an optical beam through a first media bin. The beam splitter redirects a second portion of the optical beam through a second bin. Presence of media in a given bin prevents a given redirected portion of the optical beam from reaching a detector. Misalignment of the beam splitter with the optical beam can degrade in one or both of the redirected portions of the optical beam causing undesired results.

DESCRIPTION

Various embodiments described below function to compensate for the misalignment of a beam splitter with an optical beam. In particular, a beam splitter according to an embodiment is designed to be periodically repositioned with respect to a plurality of emitters and a plurality of detectors. The repositioning follows a repositioning path that may be linear or curved. It is along this repositioning path that misalignment typically occurs. The embodiments described below provide a beam splitter with improved tolerance of such misalignments along the repositioning path.

The phrase "rotational offset" is used throughout the following description and appended claims. The phrase is used to describe an orientation of one direction with respect to another direction of axis. The phrase as used herein presumes that the two directions are not parallel. The phrase "linearly offset" is also used to describe the orientation of two objects along a common axis. That phrase presumes that the two objects are positioned adjacent to one another along that axis.

Figure 1A:
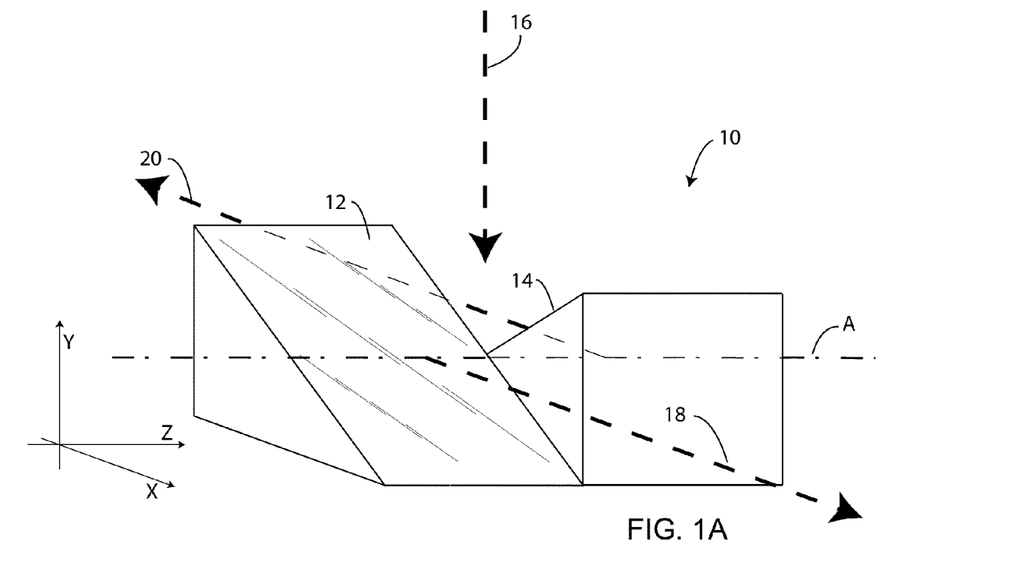
FIG. 1A is an isometric view of a redirector according to an embodiment.
Figure 1B:
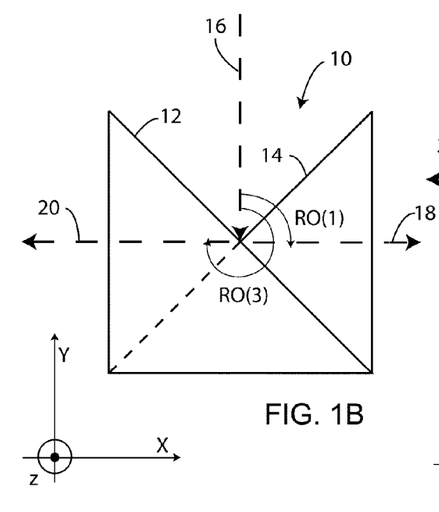
FIG. 1B is a side view of the redirector of FIG. 1A.
Figure 1C:
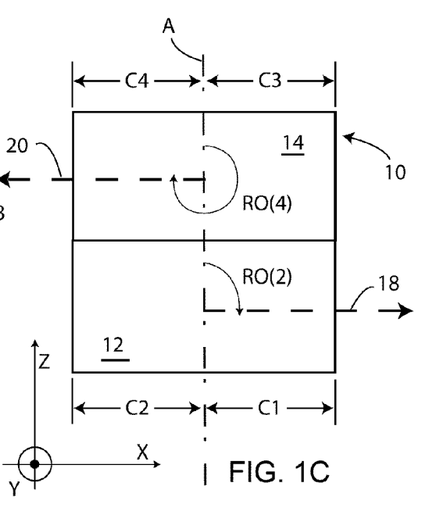
FIG. 1C is a top view of the redirector of FIG. 1A.

Beam Splitter: FIGS. 1A-1C depict an exemplary beam splitter 10 according to an embodiment. With respect to the orientation of the isometric view of FIG. 1A, FIG. 1B provides a side view, and FIG. 1C provides a top view. Beam splitter 10 is depicted to include first surface 12 and second surface 14 linearly offset from one another along axis A. First surface 12 has dimensional components C1 and C2 that radiate outward from axis A. Likewise, second surface 14 has dimensional components C3 and C4 that radiate outward from axis A. First surface 12 and second surface 14 are positioned to receive an optical beam projected along a first direction 16 that is generally perpendicular to axis A. Surfaces 12 and 14 are reflective or otherwise configured to redirect portions of the optical beam. First surface 12 is oriented to redirect a first portion of the optical beam in a second direction 18, while second surface 14 is oriented to redirect a second portion of the optical beam in a third direction 20.

Second direction 18 has a first rotational offset RO(1) with respect to first direction 16 and a second rotational offset RO(2) with respect to axis A. Third direction 20 has a third rotational offset RO(3) with respect to first direction 16 and a fourth rotational offset RO(4) with respect to axis A. The first and third rotational offsets RO(1) and RO(3) fall within the XY plane, while the second and fourth rotational RO(2) and RO(4) offsets falls within the XZ plane. In the example of FIGS. 1A-1C, second direction 18 and third direction 20 are generally perpendicular to first direction 16 while also being generally opposite one another. Thus, the first rotational offset RO(1) is about ninety degrees while the third rotational offset RO(3) is about two-hundred seventy degrees. Rotational offsets RO(2) and RO(4) are also depicted as being opposing at about ninety degrees and two hundred seventy degrees respectively. In other words, RO(2) and RO(4) are at about one hundred eighty degrees from one another. However, the actual value of each rotational offset RO(1)-RO(4) may vary depending upon the actual implementation of beam splitter 10.

Figure 2:
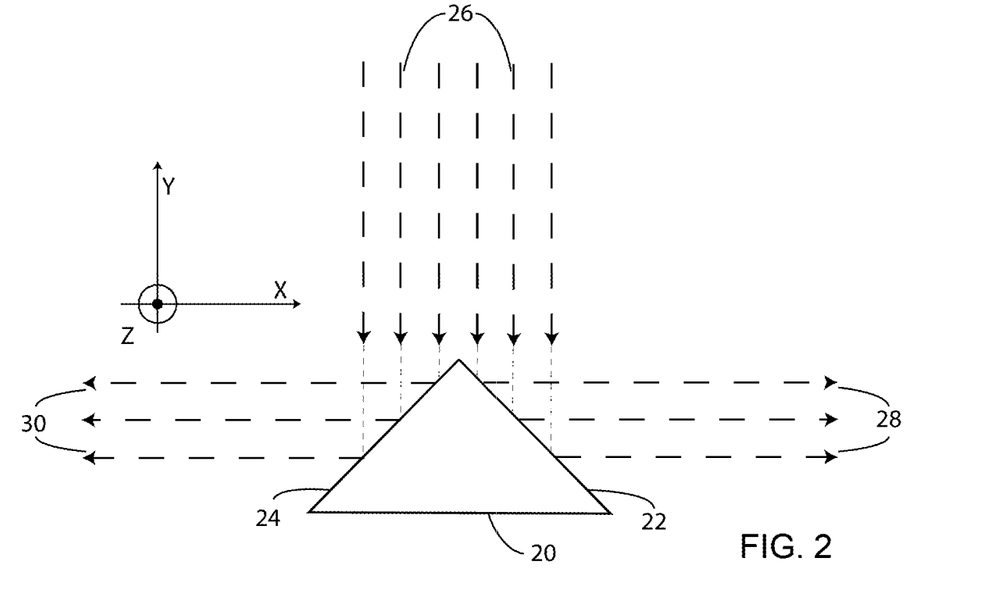
FIG. 2 is a side view of a redirector with a triangular cross section.
Figure 3:
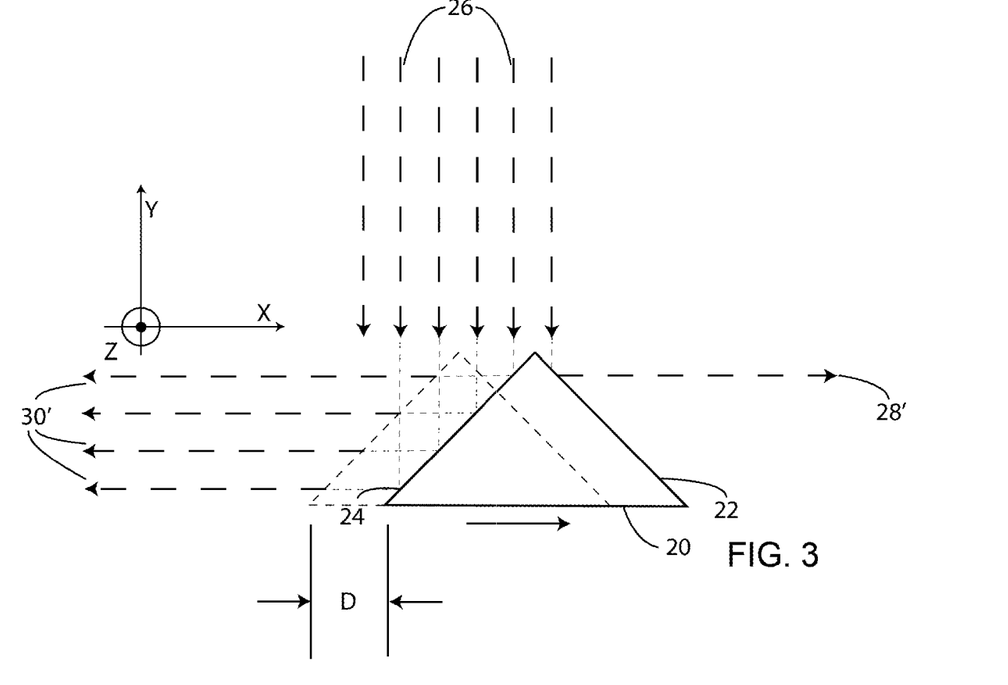
FIG. 3 is a side view in which the redirector of FIG. 2 has been offset.

Misalignment: As noted, often a beam splitter is moved along a path with the intent of aligning the beam splitter with an optical beam. For various reasons, misalignments occur. FIGS. 2 and 3 are schematic diagrams depicting effects of misalignments with a beam splitter 20 that is not configured as depicted in FIG. 1A-1C. In FIGS. 2 and 3, beam splitter 20 has a triangular cross section with opposing surfaces 22 and 24. As shown, optical beam 26 is projected on surfaces 22 and 23. In FIG. 2, a first portion 28 of optical beam 26 is redirected by surface 22 and a second portion 30 is redirected by surface 24. Beam splitter is properly aligned such that first and second portions 28 and 30 are of generally equal intensities. Moving to FIG. 3, beam splitter 20 is configured to be repositioned along a path parallel to the X axis. Here, beam splitter 20 is misaligned by a distance D along that repositioning path. As a result, surface 22 redirects a reduced portion 28' of optical beam 26 while surface 24 redirects an increased portion 30' of optical beam 26. The intensities of portions 28' and 30' differ significantly and could well produce errors in a sensing system.

Figure 4:
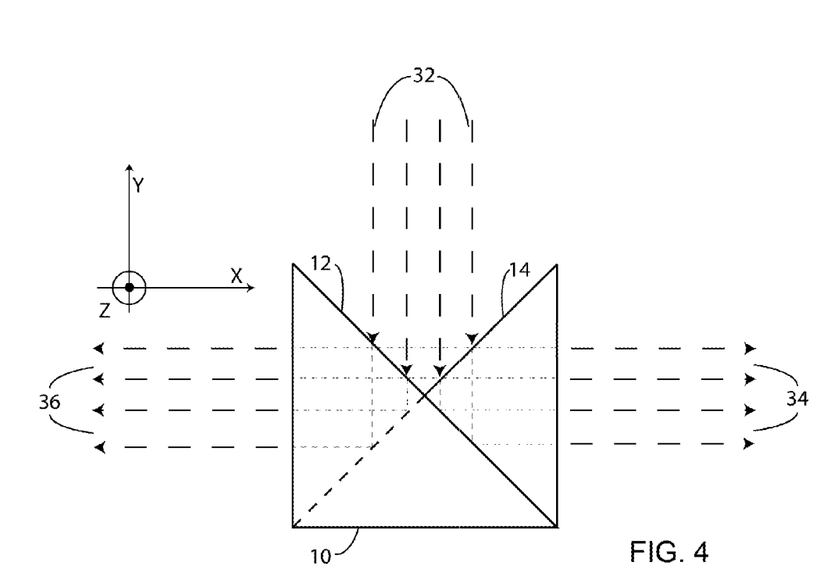
FIG. 4 is a side view of the redirector according to an embodiment.
Figure 5:
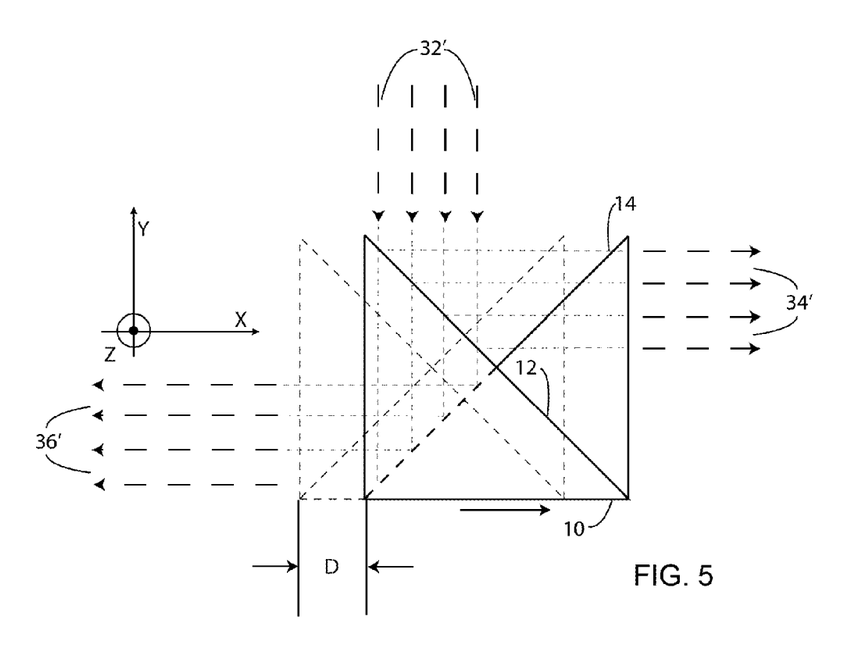
FIG. 5 is a side view in which the redirector of FIG. 4 has been offset.

Moving to FIG. 4, beam splitter 10 has been aligned with optical beam 32 allowing surface 12 and surface 14 to redirect portions 34 and 36 of optical beam 32. Portions 34 and 36 are of equal intensities. Moving to FIG. 5, beam splitter 10 is configured to be repositioned along a path parallel to the X axis. Here, beam splitter 10 is misaligned a distance D along the redirection axis. Nonetheless, surfaces 21 and 14 are positioned to redirect portions 34' and 36' of equal intensities. Thus, one can discern that beam redirector 10 is more tolerant than beam splitter 20 of misalignments along a repositioning path.

Figure 6:
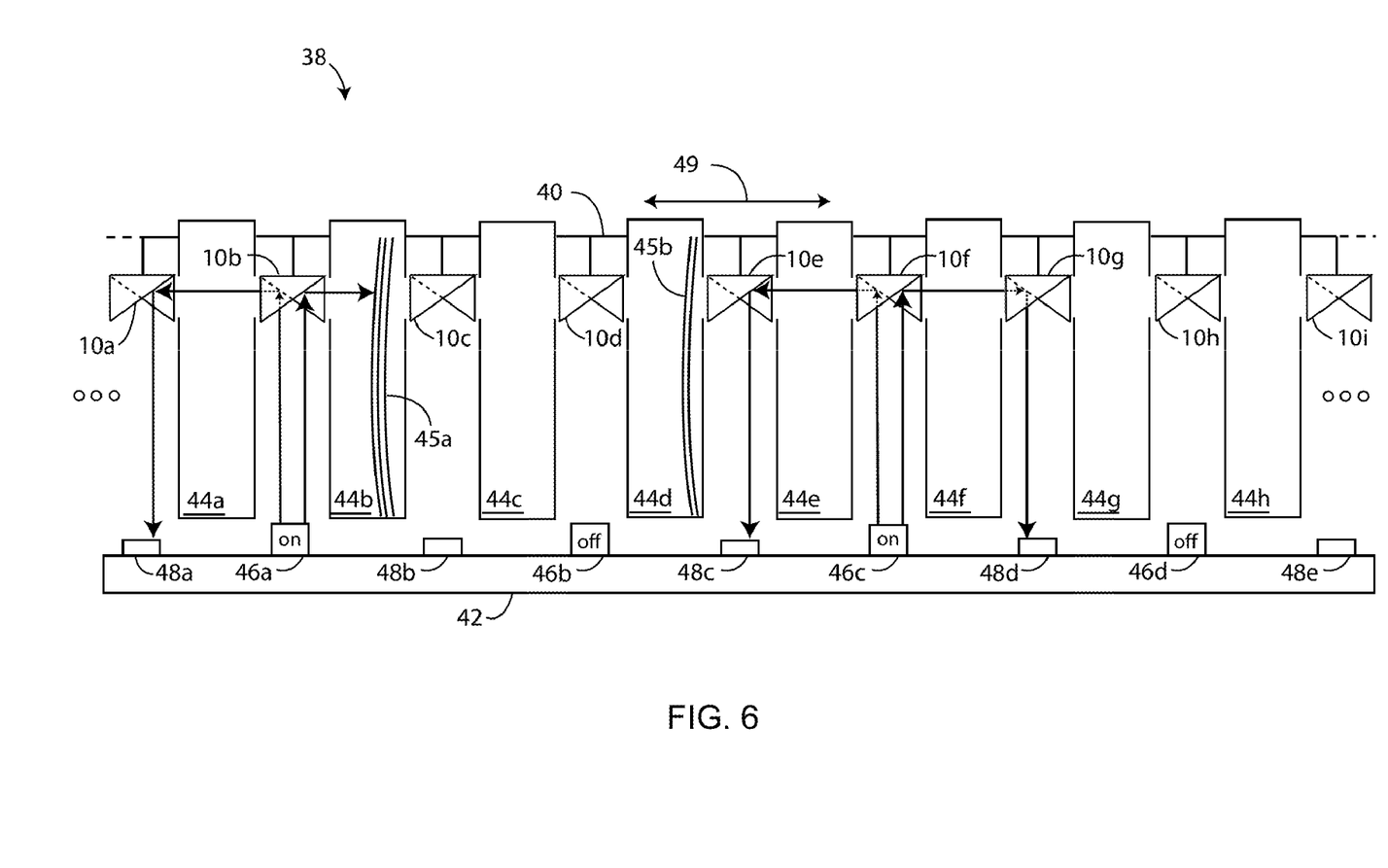
FIGS. 6 and 7 are exemplary views of a media sorter incorporating a plurality of redirectors according to an embodiment.
Figure 7:
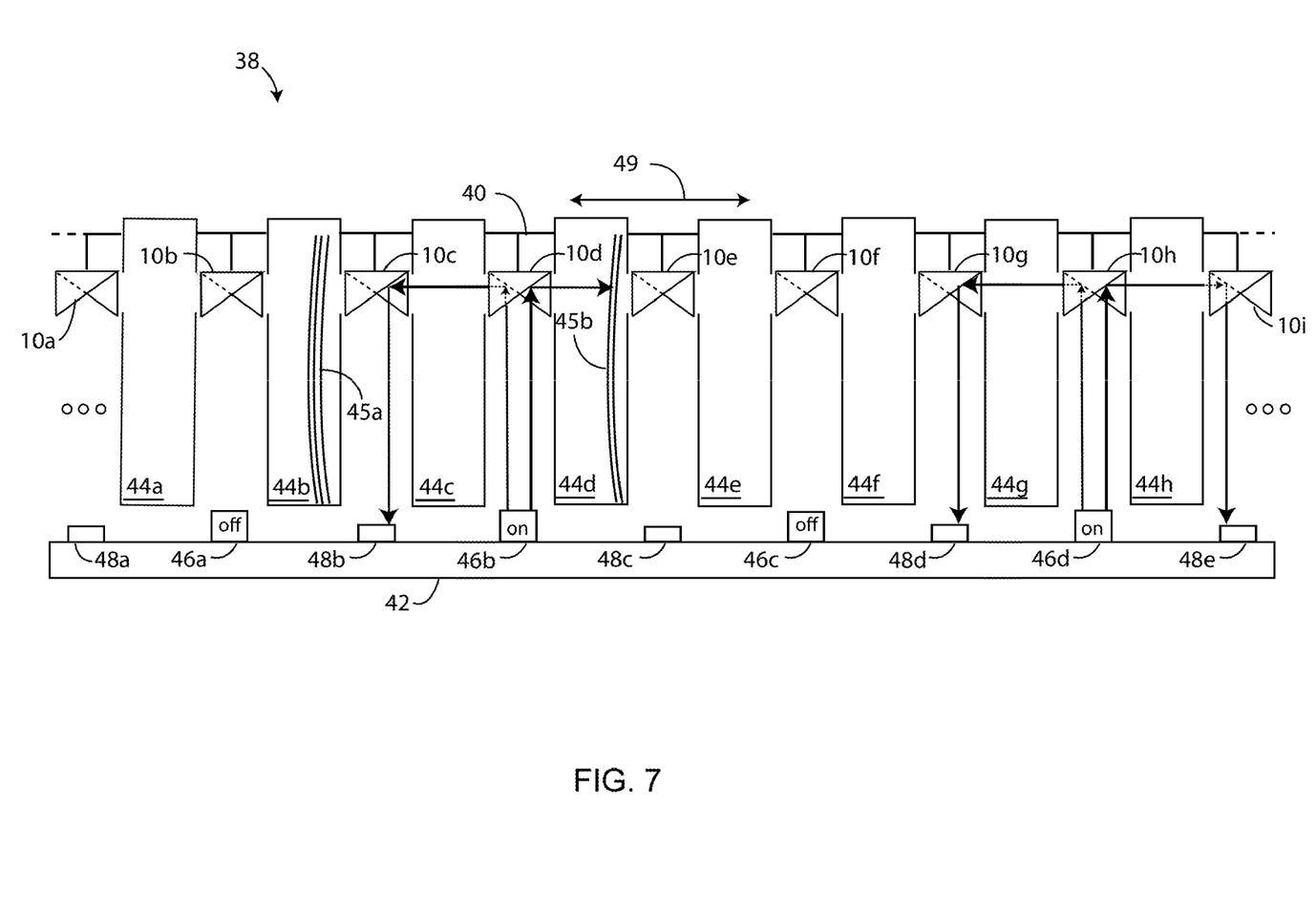

Media Sorting Applications: FIGS. 6-7 are exemplary schematic diagrams of a media sorting apparatus 38 utilizing beam splitter 10 of FIGS. 1A-1C. In particular, sorting apparatus 38 utilizes multiple beam splitters 10a-10i. Sorting apparatus 38 is shown to include portion 40 which is moveable with respect to portion 42. Portion 40 includes beam splitters 10a-10i and bins 44a-44h. Each bin 44a-44h is positioned between two of beam splitters 10a-10i. In other words, beam splitters 10a-10i and bins 44a-44h alternate in position along portion 40. Each of bins 44a-44h includes an optical path extending between those beam splitters adjacent to that bin. Each bin 44a-44h is configured to hold sheets of print media. In the example of FIGS. 6-7, bins 44b and 44d contain print media 45a and 45b respectively. The remaining bins are empty.

Figure 10:
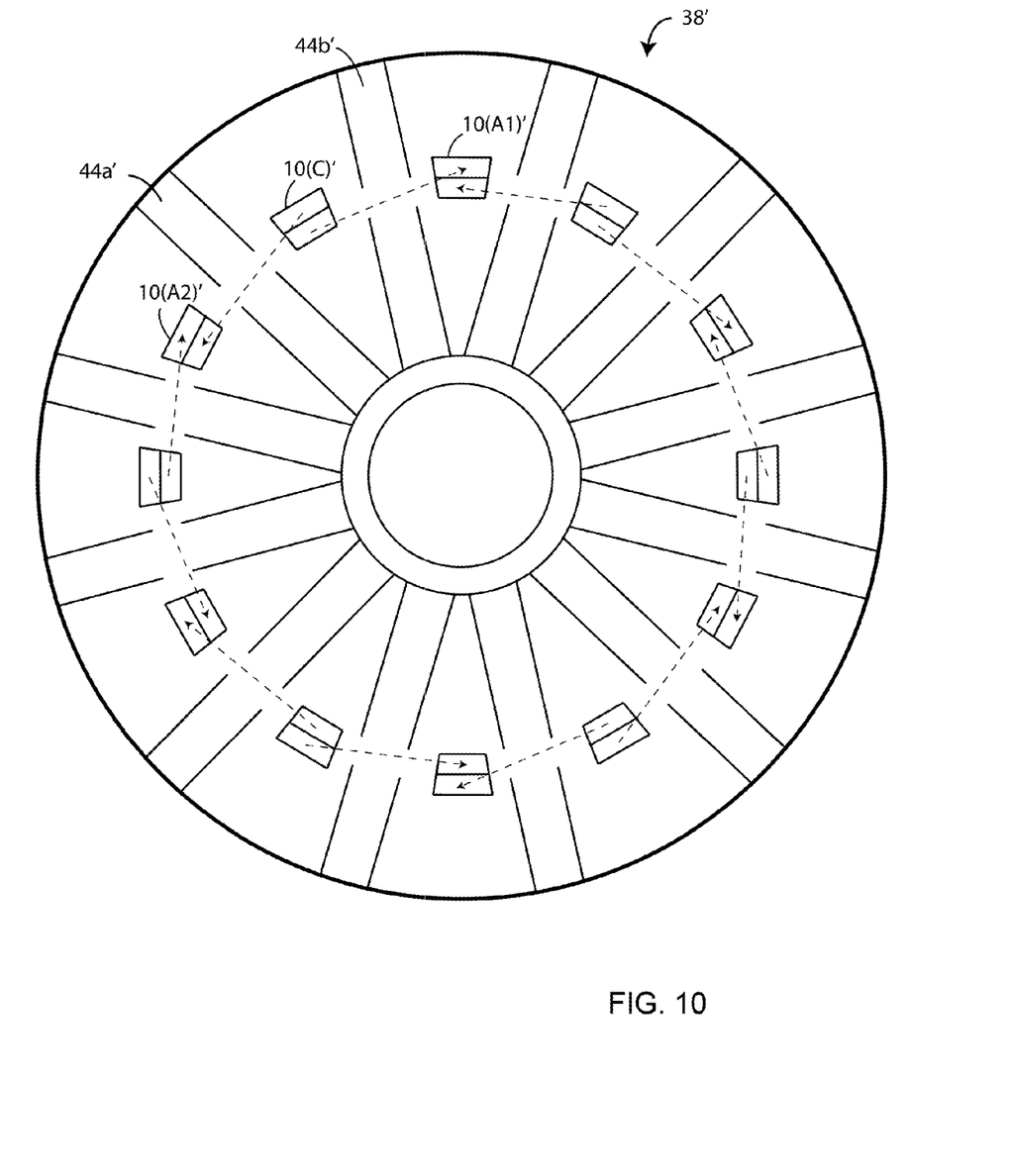
FIG. 10 is an exemplary view of a carrousel type media sorter incorporating a plurality of redirectors according to an embodiment.

Portion 42 is shown to include emitters 46a-46d and detectors 48a-48e. Each of emitters 46a-46d is configured to project an optical beam and is positioned between two of detectors 48a-48e. In other words, emitters 46a-46d and detectors 48a-48e alternate in position along portion 42. Each optical beam may be visible or non-visible light such as infra-red light. Each detector is configured to detect the presence of an optical beam. It is noted that portions 40 and 42 may be configured in a rotary fashion to form a carrousel of bins 44a-44h. In such an orientation beam splitters 10a and 10i may represent the same beam splitter and detectors 48a and 48e may represent the same detector. FIG. 10, discussed below depicts an exemplary carrousel.

Portion 40 is moveable along repositioning path 49 to align each of beam splitters 10a-10i with one of emitters 46a-46d or detectors 48a-48e. As suggested above, misalignments are anticipated. To determine which of bins 44a-44h are empty, adjacent ones of emitters 46a-46d project optical beams in an alternating fashion. Referring first to FIG. 6, emitters 46a and 46c are projecting optical beams while emitters 46b and 46d are off. Beam splitters 10b and 10f are aligned with emitters 46a and 46c respectively and are thus positioned to receive the projected optical beams. Beam splitter 10b is oriented to redirect a first portion of the optical beam projected by emitter 46a to beam splitter 10a via the optical path through bin 44a. Likewise, beam splitter 10b is also oriented to redirect a second portion of the optical beam projected by emitter 46a to beam splitter 10c via the optical path through bin 44b. The presence of print media 45a in bin 44b blocks the redirected second portion of the optical beam from reaching beam splitter 10c. However, bin 44a is empty allowing the redirected first portion of the optical beam to reach beam splitter 10a. Beam splitter 10a is oriented to redirect that first portion of the optical beam to detector 48a.

Beam splitter 10f is oriented to redirect a first portion of the optical beam projected by emitter 46c to beam splitter 10e via the optical path through bin 44e. Likewise, beam splitter 10f is also oriented to redirect a second portion of the optical beam projected by emitter 46c to beam splitter 10g via the optical path through bin 44f. Bins 44e and 44f are empty allowing the redirected first portion of the optical beam to reach beam splitter 10e and the redirected second portion of that optical beam to reach beam splitter 10g. Beam splitter 10e is oriented to redirect that first portion of the optical beam to detector 48c, while beam splitter 10g is oriented to redirect that second portion of the optical beam to detector 48d.

A controller, not shown, in communication with emitters 46a-d and detectors 48a-48e, turns emitters 46a and 46c "on" leaving emitters 46b and 46d "off" and analyzes the output generated by detectors 48a-48d. Because print media 45a blocks any portion of an optical beam from reaching detector 48b, the output of detector 48b will indicate that bin 44b is not empty. Because portions of optical beams projected by emitters 46a and 46c ultimately reach detectors 48a, 48c, and 48d, the output of detectors 48a, 48c, and 48d will indicate that bins 44a, 44e, and 44f are empty.

Referring next to FIG. 7, emitters 46b and 46d are projecting optical beams while emitters 46A and 46C are off. Beam splitters 10d and 10h are aligned with emitters 46b and 46d respectively and are thus positioned to receive the projected optical beams. Beam splitter 10d is oriented to redirect a first portion of the optical beam projected by emitter 46b to beam splitter 10c via the optical path through bin 44c. Likewise, beam splitter 10d is oriented to redirect a second portion of the optical beam projected by emitter 46b to beam splitter 10e via the optical path through bin 44d. The presence of print media 45b in bin 44d blocks the redirected second portion of the optical beam from reaching beam splitter 10e. However, bin 44c is empty allowing the redirected first portion of the optical beam to reach beam splitter 10c. Beam splitter 10c is oriented to redirect that first portion of the optical beam to detector 48b.

Beam splitter 10h is oriented to redirect a first portion of the optical beam projected by emitter 46d to beam splitter 10g via the optical path through bin 44g. Likewise, beam splitter 10h is oriented to redirect a second portion of the optical beam projected by emitter 46d to beam splitter 10i via the optical path through bin 44h. Bins 44g and 44h are empty allowing the redirected first portion of the optical beam to reach beam splitter 10g and the redirected second portion of that optical beam to reach beam splitter 10i. Beam splitter 10g is oriented to redirect that first portion of the optical beam to detector 48d while beam splitter 10i is oriented to redirect that second portion of the optical beam to detector 48e.

The controller, not shown but mentioned above, turns emitters 46b and 46d "on" leaving emitters 46a and 46c "off" and analyzes the output generated by detectors 48b-48e. Because print media 45b blocks any portion of an optical beam from reaching detector 48c, the output of detector 48c will indicate that bin 44d is not empty. Because portions of optical beams projected by emitters 46b and 46d ultimately reach detectors 48b, 48d, and 48e, the output of detectors 48b, 48d, and 48e will indicate that bins 44c, 44g, and 44h are empty.

Figure 8:
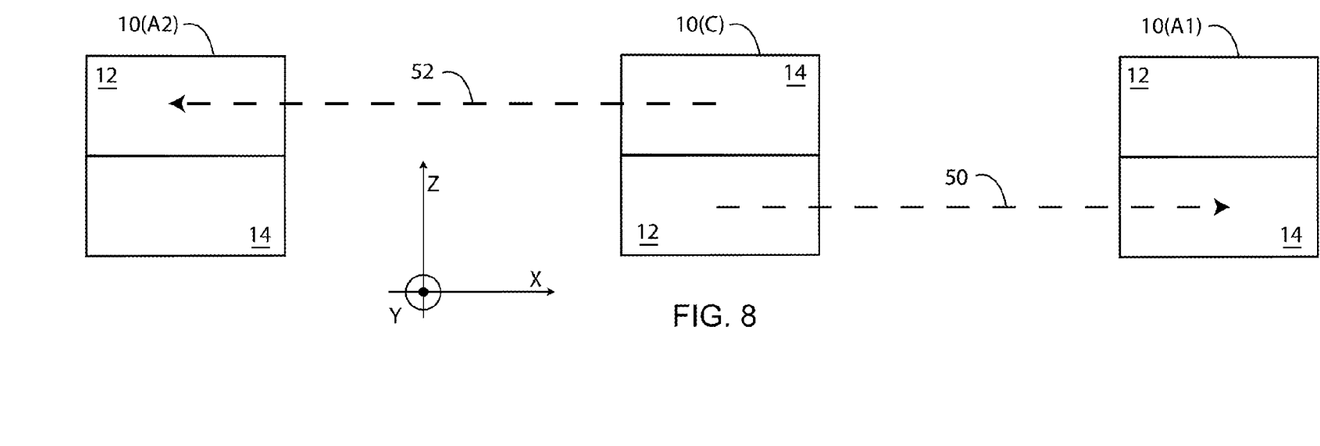
FIGS. 8 and 9 illustrate exemplary linear redirection paths according to embodiments.
Figure 9:
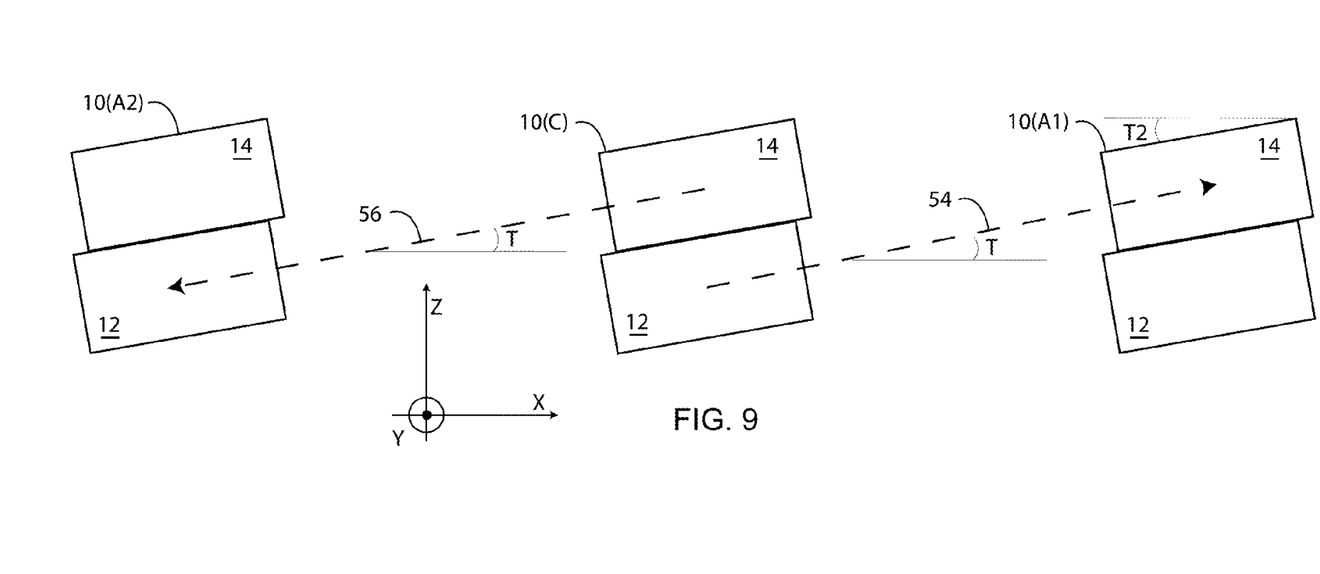

FIGS. 8-9 illustrate exemplary orientations of adjacent beam splitters utilized by a media sorting apparatus such as apparatus 38 in FIGS. 6-7. In FIGS. 8-9, there is a center beam splitter 10(C) with adjacent beam splitters 10(A1) and 10(A2) all oriented along an X axis. Referring first to FIG. 8, center beam splitter 10(C) is positioned to receive an optical beam. Surface 12 is oriented to redirect a first portion of that optical beam in direction 50 toward surface 14 of beam splitter 10(A1). Surface 14 of center beam splitter 10(C) is oriented to redirect a second portion of that optical beam in direction 52 toward surface 12 of beam splitter 10(A2). Adjacent beam splitters 10(A1) and 10(A2) are rotated one hundred eighty degrees with respect to center beam splitter 10(C) so that directions 50 and 52 are parallel to one another and to the X axis.

Referring to FIG. 9, center beam splitter 10(C) is positioned to receive an optical beam. Surface 12 is oriented to redirect a first portion of that optical beam in direction 54 toward surface 14 of beam splitter 10(A1). Surface 14 of center beam splitter 10(C) is oriented to redirect a second portion of that optical beam in direction 56 toward surface 12 of beam splitter 10(A2). Adjacent beam splitters 10(A1) and 10(A2) are not rotated one hundred eighty degrees with respect to center beam splitter 10(C). Instead, so that directions 50 and 52 are parallel to one another, surfaces 12 and 14 are oriented so that directions 54 and 56, while still parallel to one another, are tilted by an angle T with respect to the X axis.

Figure 11:
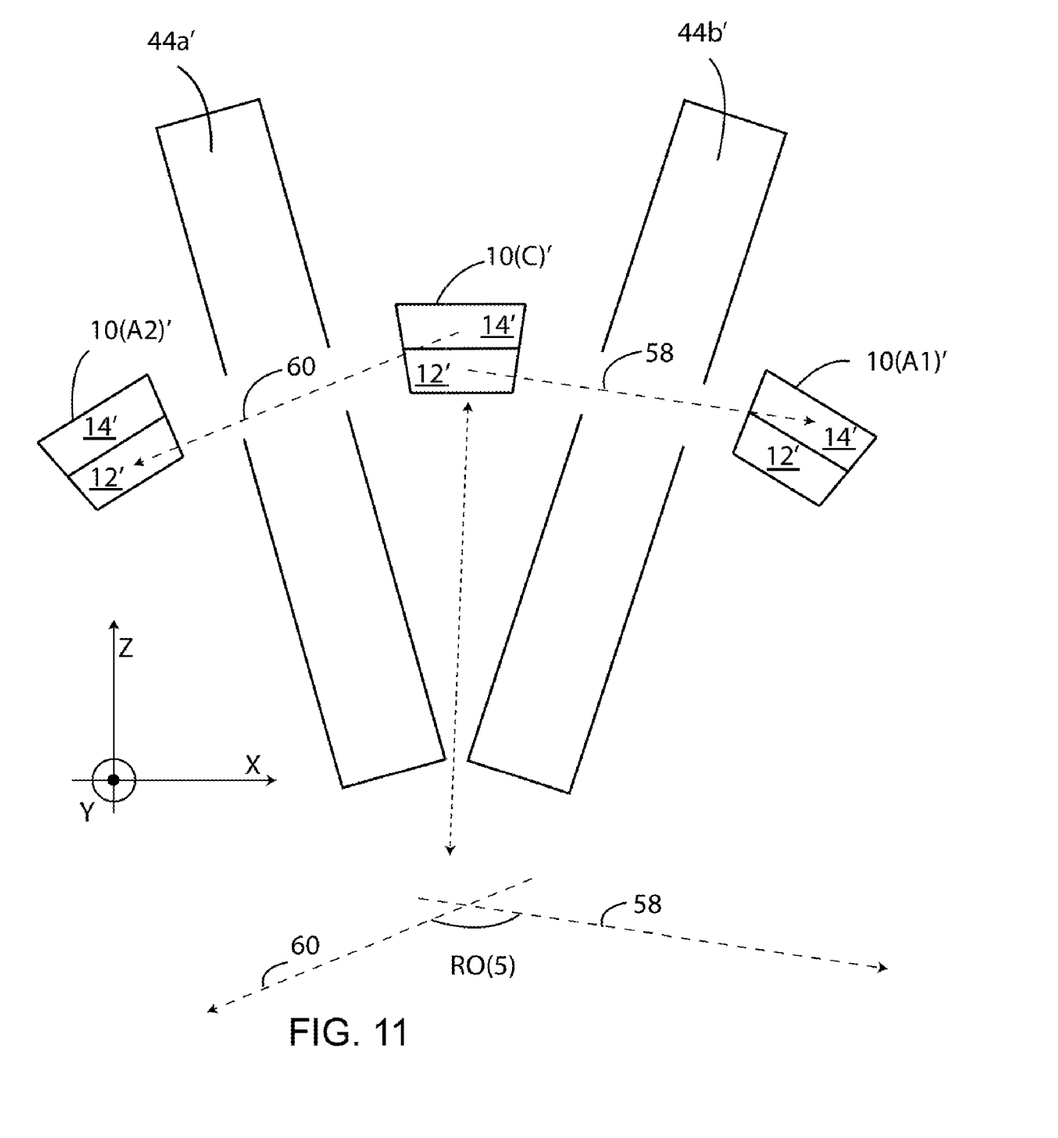
FIG. 11 illustrates an exemplary angular redirection path according to an embodiment.

In to FIGS. 8 and 9, center beam splitter 10(C) is configured to redirect an optical beam along a linear redirection path. In other words, the redirected portions of the optical beam follow directions that are parallel to and opposite one another. Such works well in a media sorting apparatus in which the bins are situated along a common linear axis. Referring now to FIGS. 10-11, bins 44' and beam splitters 10' of media sorting apparatus 38' are rotationally offset from one another within a carrousel. The carrousel is configured rotate causing beam splitters 10(C)', 10(A1)', 10(A2)' and the others to follow a curved repositioning path. Referring to FIG. 11, center beam splitter 10(C)' is positioned to receive an optical beam. Surface 12' is oriented to redirect a first portion of that optical beam in direction 58 toward surface 14' of beam splitter 10(A1)'. Surface 14' of center beam splitter 10(C)' is oriented to redirect a second portion of that optical beam in direction 60 toward surface 12' of beam splitter 10(A2)'. Surfaces 12' and 14' are oriented so that directions 58 and 60 have a rotational offset RO(5) with respect to one another. Thus, center beam splitter 10(C)' is configured to redirect the optical beam along an angular redirection path with surfaces 12' and 14' of center beam splitter 10(C)' generally serving as a vertex.

Figure 12:
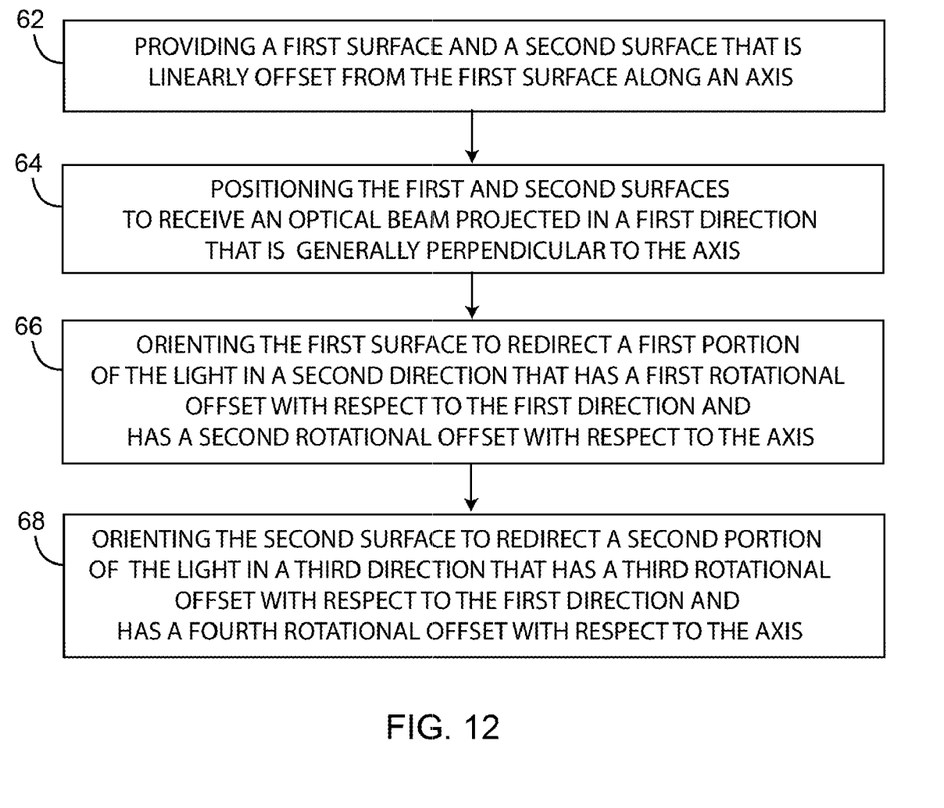
FIG. 12 is an exemplary flow diagram depicting steps taken to implement an embodiment.

Operation: FIG. 12 is an exemplary flow diagram depicting steps taken to implement an embodiment. In discussing FIG. 12, reference is made to the diagrams of FIGS. 1A-1C and 7-11 to provide contextual examples. Implementation, however, is not limited to those examples. First and second surface as are provided such that the first surface is linearly offset from the second surface along an axis (step 62). Referring back to FIGS. 1A-1C, one can see that surface 12 is linearly offset with respect to surface 14 along axis A.

The first and second surfaces are positioned to receive an optical beam projected in a first direction that is generally perpendicular to the first direction (step 64). Referring back to FIGS. 1A-1C, one can see that surfaces 12 and 14 are positioned to receive an optical beam that is projected in direction 16 and that direction 16 is generally perpendicular to axis A.

The first surface is oriented to redirect a first portion of the optical beam in a second direction (step 66). The second direction has a first rotational offset with respect to the first direction and a second rotational offset with respect to the axis. Referring back to FIGS. 1A-1C, one can see that first surface 12 is oriented to redirect a portion of an optical beam in second direction 18. Second direction 18 has a first rotational offset RO(1) with respect to direction 16 and a second rotational offset RO(2) with respect to axis A.

The second surface is oriented to redirect a first portion of the optical beam in a third direction (step 68). The third direction has a third rotational offset with respect to the first direction and a fourth rotational offset with respect to the axis. Referring back to FIGS. 1A-1C, one can see that second surface 14 is oriented to redirect a portion of an optical beam in third direction 20. Third direction 20 has a third rotational offset RO(3) with respect to direction 16 and a fourth rotational offset RO(4) with respect to axis A.

Step 62 can include providing the first and second surfaces such that dimensional components of the first and second surfaces radiate outward from the axis in the second and third directions. Looking at FIG. 1C, dimensional components C1 and C2 of first surface 12 radiate outward from axis A in second and third directions 18 and 20. Likewise, dimensional components C3 and C4 of second surface 14 radiate outward from axis A in second and third directions 18 and 20.

Step 66 can include orienting the first surface to redirect a first portion of the beam through a first bin only if the first bin is empty, while step 68 can include orienting the second surface to redirect a second portion of the optical beam through a second bin only if the second bin is empty. Looking at FIG. 6, beam splitter 10b has surfaces that are oriented to redirect different portions of an optical beam through adjacent bins 44a and 44b. Bin 44b is not empty so no portion of the optical beam is redirected through bin 44b.

Step 66 can include orienting the first surface comprises to redirect a first portion of the beam through the first bin to a third surface of a first adjacent beam splitter only if the first bin is empty. Step 68 can include orienting the second surface to redirect a second portion of the optical beam through the second bin to a fourth surface of a second adjacent beam splitter only if the second bin is empty. Looking at FIG. 6, beam splitter 10b has surfaces that are oriented to redirect different portions of an optical beam through adjacent bins 44a and 44b to adjacent beam splitters 10a and 10c. Bin 44b is not empty so no portion of the optical beam is redirected through bin 44b to beam splitter 10c.

Conclusion: The present invention has been shown and described with reference to the foregoing exemplary embodiments. It is to be understood, however, that other forms, details and embodiments may be made without departing from the spirit and scope of the invention that is defined in the following claims.

What is claimed is:

1. A beam splitter, comprising a first surface and a second surface, wherein:
    the first and second surfaces are linearly offset from one another along an axis;
    the first and second surfaces are positioned to receive an optical beam projected in a first direction that is generally perpendicular to the axis;
    the first surface is configured to redirect a first portion of the optical beam in a second direction that has a first rotational offset with respect to the first direction and a second rotational offset with respect to the axis;
    the second surface is configured to redirect a second portion of the optical beam in a third direction that has a third rotational offset with respect to the first direction and a fourth rotational offset with respect to the axis;
    the first surface is configured to redirect a first portion of the optical beam through a first bin only if the first bin is empty; and
    the second surface is configured to redirect a second portion of the optical beam through a second bin only if the second bin is empty.

2. The beam splitter of claim 1, wherein:
    dimensional components of the first surface radiate outward from the axis in the second and third directions; and
    dimensional components of the second surface radiate outward from the axis in the second and third directions.

3. The beam splitter of claim 1, wherein the second and third directions follow a redirection path, and the second and third directions are opposite one another along the redirection path.

4. The beam splitter of claim 3, wherein the redirection path is a linear path such that the second direction is generally opposite the third direction.

5. The beam splitter of claim 3, wherein the redirection path is an angular path with a vertex at or near the first and second surfaces such that the second direction has a fifth rotational offset with respect to the third direction.

6. The beam splitter of claim 1, wherein:
    the first surface is configured to redirect a first portion of the beam through the first bin to a third surface of a first adjacent beam splitter only if the first bin is empty;

the second surface is configured to redirect a second portion of the optical beam through the second bin to a fourth surface of a second adjacent beam splitter only if the second bin is empty.

7. The beam splitter of claim 1, wherein the first and second surfaces are reflective surfaces.

8. A beam splitting system comprising a first beam splitter, a second beam splitter and a third beam splitter, the first beam splitter including a first surface and a second surface, wherein:
the first and second surfaces are linearly offset from one another along an axis;
the first and second surfaces can be positioned to receive an optical beam projected by an emitter in a first direction that is generally perpendicular to the axis;
the first surface is configured to redirect a first portion of the optical beam in a second direction to a third surface of the second beam splitter, the second direction having a first rotational offset with respect to the first direction and a second rotational offset with respect to the axis;
the second surface is configured to redirect a second portion of the optical beam in a third direction to a fourth surface of the third beam splitter, the third direction having a third rotational offset with respect to the first direction and a fourth rotational offset with respect to the axis;
the first surface is configured to redirect a first portion of the beam through a first bin reaching the third surface only if the first bin is empty; and
the second surface is configured to redirect a second portion of the beam through a second bin reaching the fourth surface only if the second bin is empty.

9. The beam splitting system of claim 8, wherein;
dimensional components of the first surface radiate outward from the axis in the second and third directions; and
dimensional components of the second surface radiate outward from the axis in the second and third directions.

10. The beam splitting system of claim 8, wherein the second and third directions follow a redirection path that passes from the second beam splitter to the first beam splitter and on to the third beam splitter, the second and third directions being opposite one another along the redirection path.

11. The beam splitting system of claim 10, wherein the redirection path is a linear path such that the second direction is generally opposite the third direction.

12. The beam splitting system of claim 10, wherein the redirection path is an angular path with a vertex positioned at or near the first beam splitter such that the second direction has a fifth rotational offset with respect to the third direction.

13. The beam splitting system of claim 8, wherein:
the third surface is configured to redirect the first portion of the optical beam to a first detector; and
the fourth surface is configured to redirect the second portion of the optical beam to a second detector.

14. The beam splitting system of claim 8, wherein:
the axis is a first axis, the optical beam is a first optical beam, and the emitter is a first emitter;
the second beam splitter includes the third surface and a fifth surface;
the third and fifth surfaces are linearly offset from one another along a second axis;
the third and fifth surfaces can be positioned to receive a second optical beam projected by a second emitter in a fourth direction that is generally perpendicular to the second axis;
the third surface is configured to redirect a first portion of the second optical beam in a fifth direction to the first surface of the first beam splitter, the fifth direction having a sixth rotational offset with respect to the fourth direction and a seventh rotational offset with respect to the second axis;
the second surface is configured to redirect a second portion of the second optical beam in a sixth direction to a sixth surface of a fourth beam splitter, the sixth direction having an eighth rotational offset with respect to the fourth direction and a ninth rotational offset with respect to the second axis.

15. A method, comprising;
providing a first surface and a second surface that is linearly offset from the first surface along an axis;
positioning the first and second surfaces to receive an optical beam projected in a first direction that is generally perpendicular to the axis;
orienting the first surface to redirect a first portion of the optical beam in a second direction that has a first rotational offset with respect to the first direction and a second rotational offset with respect to the axis;
orienting the second surface to redirect a second portion of the optical beam in a third direction that has a third rotational offset with respect to the first direction and a fourth rotational offset with respect to the axis;
orienting the first surface comprises orienting the first surface to redirect a first portion of the beam through a first bin only if the first bin is empty; and
orienting the second surface comprises orienting the second surface to redirect a second portion of the optical beam through a second bin only if the second bin is empty .

16. The method of claim 15, wherein providing comprises providing the first and second surfaces such that:
dimensional components of the first surface radiate outward from the axis in the second and third directions; and
dimensional components of the second surface radiate outward from the axis in the second and third directions.

17. The method of claim 15, wherein:
orienting the first surface comprises orienting the first surface to redirect a first portion of the beam through the first bin to a third surface of a first adjacent beam splitter only if the first bin is empty;
orienting the second surface comprises to redirect a second portion of the optical beam through the second bin to a fourth surface of a second adjacent beam splitter only if the second bin is empty.

* * * * *

UNITED STATES PATENT AND TRADEMARK OFFICE
CERTIFICATE OF CORRECTION

PATENT NO. : 8,274,740 B2  
APPLICATION NO. : 12/427171  
DATED : September 25, 2012  
INVENTOR(S) : Kenneth Raymond Hotelling et al.

Page 1 of 1

It is certified that error appears in the above-identified patent and that said Letters Patent is hereby corrected as shown below:

In column 8, line 41, in Claim 15, delete "empty ." and insert -- empty. --, therefor.

Signed and Sealed this
Twelfth Day of February, 2013

Teresa Stanek Rea
*Acting Director of the United States Patent and Trademark Office*